UNITED STATES PATENT OFFICE.

TERRENCE McSWEENEY, OF ALLEGHENY, ASSIGNOR OF ONE-HALF TO THOMAS A. GILLESPIE, OF PITTSBURG, PENNSYLVANIA.

COMPOSITION FOR SURFACING STRUCTURAL ARTICLES.

SPECIFICATION forming part of Letters Patent No. 381,882, dated April 24, 1888.

Application filed October 17, 1887. Serial No. 252,596. (No specimens.)

*To all whom it may concern:*

Be it known that I, TERRENCE McSWEENEY, residing at Allegheny, in the county of Allegheny and State of Pennsylvania, a citizen of the United States, have invented or discovered certain new and useful Improvements in Compositions for Surfacing Structural Articles, of which improvements the following is a specification.

The invention herein relates to certain improvements in compositions for coating the surfaces of pipes, conduits, and other structural articles wherein a smooth polished surface is desirable, and wherein it is necessary to protect the surfaces from atmospheric influences.

In the practice of my invention I melt in any suitable manner a quantity of rosin proportional to the amount necessary to coat the surfaces to be covered, and then stir in approximately equal proportions of plaster-of-paris and finely-pulverized glass or sand in such quantities as will impart a body to the mixture without impairing the fluidity to such an extent as to prevent the application of the mixture by a brush or any other suitable means. The mixture is applied while hot to the surfaces to be coated by a brush, sponge, or other suitable means, and then allowed to cool and harden. Any desired or suitable coloring-matter may be added to the mixture.

The above-described mixture forms a hard, durable, and smooth surface, and is especially adapted to the surfacing of paper or composition pipes or conduits used for conducting water, gas, or other fluids, and also for other structural articles where they are exposed to atmospheric influences.

I claim herein as my invention—

A composition for surfacing pipes, conduits, or other structural articles, the same consisting of rosin, plaster-of-paris, and pulverized glass or sand, substantially as set forth.

In testimony whereof I have hereunto set my hand.

TERRENCE McSWEENEY.

Witnesses:
 DARWIN S. WOLCOTT,
 R. H. WHITTLESEY.